Oct. 2, 1956     C. M. TURSKY     2,765,084
LIQUID FILTERS
Filed July 15, 1952
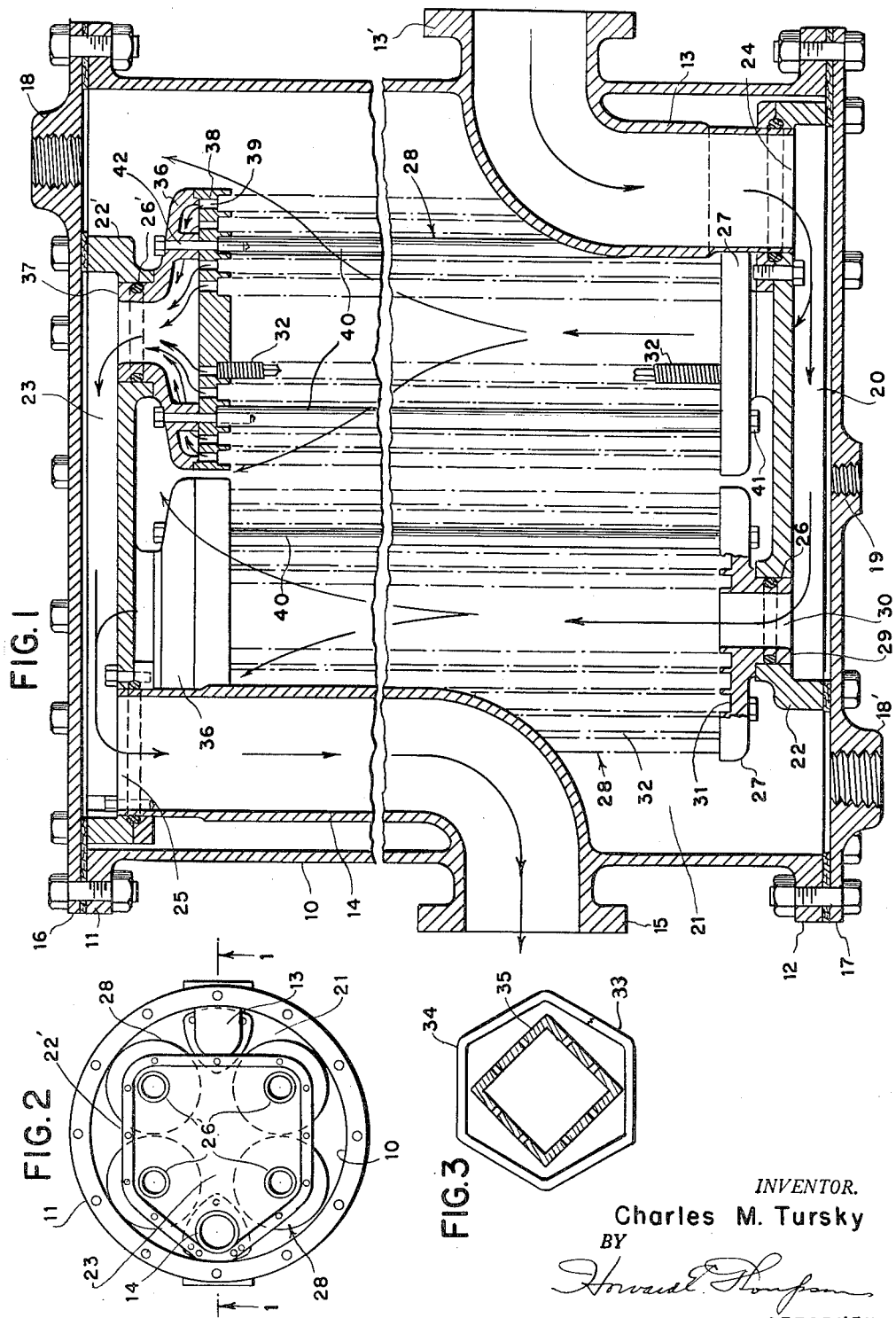
INVENTOR.
Charles M. Tursky
BY
*Howard T. Thompson*
ATTORNEY.

United States Patent Office 2,765,084
Patented Oct. 2, 1956

2,765,084

LIQUID FILTERS

Charles M. Tursky, Neshanic, N. J.

Application July 15, 1952, Serial No. 299,057

3 Claims. (Cl. 210—184)

This invention relates to filters designed for use in filtering liquids of various types and kinds. More particularly, the invention deals with an apparatus of the character described, wherein the liquid to be filtered is passed inwardly through a plurality of filter coils arranged in a casing, thus providing a large capacity area for the liquid and, further, maintaining the sediment or filtered-out elements on the exterior of the coils, thus facilitating cleaning out of the filter from time to time.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a sectional view through a filter apparatus made according to my invention, the section being substantially on the line 1—1 of Fig. 2 with parts of the construction broken away and with parts in elevation.

Fig. 2 is a plan view of the structure shown in Fig. 1 with the top cover plate removed.

Fig. 3 is an enlarged diagrammatic section through one of the filter coils which I employ.

In Fig. 1 of the drawing, I have shown at 10 a filter casing, having an upper flange 11 and lower flange 12. Arranged with sides of the casing are tubular members, one member forming an inlet 13 with a protruding flange portion 13', with which a fluid supply pipe is adapted to be coupled. The other member forms an exhaust 14, which also includes a flange projection 15, with which a discharge or exhaust pipe is adapted to be coupled.

At 16 and 17 I have shown top and bottom cover plates, which plates are substantially identical, in that they have common threaded bosses 18, 18', the boss 18 being utilized for coupling a slushing pipe with the apparatus, wherein the boss 18' is utilized for attachment of a drain pipe with the apparatus. The plate 17 also includes another threaded boss 19 for a supplemental drain pipe for draining a liquid distributing chamber 20 at the lower portion of the casing 10 and within the primary distributing chamber 21 of the casing.

The chamber 20 is formed by a housing 22, which is secured to the plate 17. A similar housing 22' is provided for the plate 16 and this housing forms an exhaust distributor chamber 23. It will appear that the member 13 communicates with the chamber 20, as at 24; whereas, the manifold 14 communicates with the chamber 23, as at 25. The members 13 and 14 have suitably packed mountings in the housings 22, 22'.

The housings are generally of the contour illustrated in Fig. 2 of the drawing, in which figure the housing 22' is shown and it will be understood that the positions of the housings are reversed, so as to bring the manifolds into communication therewith, as will be clearly apparent from a consideration of Fig. 1 of the drawing.

The housings have four bushing or bearing portions 26, 26'. Mounted and sealed in the portions 26 are base plates 27 of four filter units 28. The base plates have downwardly projecting sleeves 29, which fit in the bearing portions 26 and the bores 30 of these sleeves open into the chamber 20 and upwardly into the center portion of each of the units.

The plates 27 also have circumferentially and radially spaced sockets 31 for receiving lower end portions of a plurality of filter elements 32. These elements are diagrammatically shown, for the most part, in dot and dash lines and each filter element comprises a coil 33 of hexagonal form and the bent corners 34 form enlargements, which space adjacent coils one from the other in controlling filtering in accordance with the teachings in my prior application, Serial Number 183,553, filed September 7, 1950, now issued as Patent No. 2,667,272, dated January 26, 1954.

Disposed within the coils 33 is an apertured tube 35 of rectangular cross-sectional form, into which the filtered liquid is adapted to pass for discharge into headers 36 mounted in the bearing portions 26' of the housing 22'. The headers 36 have sleeve portions 37, similar to the sleeves 29. The headers 36 include plates 38 having a plurality of apertures 39, in which the upper ends of the coils 33 and tube 35 are sealed, so that all filtered fluid passes into the headers 36 and, thus, into the chamber 23 for discharge through the member 14.

Each unit 28 is held in assembled relationship by a plurality of rods 40 which seat on the plates 27 and the plate 38 and screws 41 pass through the plates 27 to engage the rods 40 and screws 42 pass through the headers 36 and plates 38 to engage the upper ends of said rods.

From the foregoing, it will be apparent that preassembled units 28 are readily attached and detached with respect to the casing 10.

It will be understood that, in the use of the filtering apparatus, the liquid to be filtered, after passing into the chamber 20, extends upwardly into the central portion of each of the units 28 through the apertures 30 in the sleeves 29. The liquid then passes generally into the chamber 21 and through the various coils 33, then into the apertured tubes 35, then into the headers 36 and chamber 23 and out through the member 14. Oftentimes, the liquid is introduced into the filter under pressure which results in creating a turbulence within the chamber 21 and this will operate to impart some movement to the filter elements 33 and, tend to displace sediment or the like collecting on the outer surface of the elements and these particles will drop into the lower portion of the chamber 21 and can be drained out from time to time. It will also be understood that, when it is desirable to clean out the filter, a reverse flow of a cleaning liquid can take place by admission of such fluid through the member 14 and this will readily clear out the coils. At the same time, the inlet at 18 can be utilized for this purpose.

It will also be understood that, by using substantially similar parts in the construction of the apparatus, the cost of producing the same is materially reduced.

In the use of my improved filter units, it will be apparent that the liquid to be filtered is drawn by a suction pump into the center of each unit and, thus, through the filter coils or elements, the major portion of the filtering action taking place in the initial contact with the coils or elements. Here it must be understood that the circumferential, as well as radial, spacing of the coils is such as to provide a substantial closure within the unit, leaving simply slight passages between the spaced coils for passage of the liquid into the casing beyond the limit of the coils. In the casing outwardly of the coil, or coils, there is substantially no turbulence and this facilitates settlement of the solids or filtered out particles of the liquid to the bottom of the casing.

The action of the liquid on the peripheral surfaces of the coils will act to a large degree to free filtered out particles for transmission into the casing chamber. It will also be apparent that cleaning of the filter coils is facilitated in reverse flow of a liquid through the coils brought into the center portion of the unit, as well as into the chamber of the casing.

Having fully described my invention, what I claim as new and desire to secure by Letters Patent is:

1. A filter comprising a tubular casing having side walls, sides of the casing having liquid inlet and outlet tubular members arranged therein and opening outwardly through said side walls, one member being directed to one end of the casing, the other member being directed to the opposed end of the casing, the casing having removable upper and lower covers, housings arranged inwardly of the covers adjacent the casing ends, said covers and housings collectively forming distributor chambers, with which said tubular members communicate, a plurality of filter units in said casing, each unit comprising an apertured plate mounted in one housing and an apertured header mounted in the other housing, a plurality of filter coils mounted in and extending between said plates and headers of the respective units, means for joining and spacing said plates and headers, the apertures of said plate opening into the casing externally of the space defined within the filter coils as well as into the adjacent distributor chamber, said filter coils having apertured tubes arranged therein, said apertured discharge tubes communicating with the header apertures in each unit, and the liquid from said tubes being directed to said outlet member from the apertures of said header and distributor chamber of the adjacent housing.

2. A filter comprising a tubular casing having side walls, sides of the casing having liquid inlet and outlet tubular members arranged therein and opening outwardly through said side walls, one member being directed to one end of the casing, the other member being directed to the opposed end of the casing, the casing having removable upper and lower covers, housings arranged inwardly of the covers adjacent the casing ends, said covers and housings collectively forming distributor chambers, with which said tubular members communicate, a plurality of filter units in said casing, each unit comprising an apertured plate mounted in one housing and an apertured header mounted in the other housing, a plurality of filter coils mounted in and extending between said plates and headers of the respective units, means for joining and spacing said plates and headers, the apertures of said plate opening into the casing externally of the space defined within the filter coils as well as into the adjacent distributor chamber, said filter coils having apertured tubes arranged therein, said apertured discharge tubes communicating with the header apertures in each unit, the liquid from said tubes being directed to said outlet member from the apertures of said header and distributor chamber of the adjacent housing, said housings dividing the interior of the casing into distributor chambers and a filtering space, and means on the lower cover for draining said filtering space.

3. A filter comprising a tubular casing having side walls, sides of the casing having liquid inlet and outlet tubular members arranged therein and opening outwardly through said side walls, one member being directed to one end of the casing, the other member being directed to the opposed end of the casing, the casing having removable upper and lower covers, housings arranged inwardly of the covers adjacent the casing ends, said covers and housings collectively forming distributor chambers, with which said tubular members communicate, a plurality of filter units in said casing, each unit comprising an apertured plate mounted in one housing and an apertured header mounted in the other housing, a plurality of filter coils mounted in and extending between said plates and headers of the respective units, means for joining and spacing said plates and headers, the apertures of said plate opening into the casing externally of the space defined within the filter coils as well as into the adjacent distributor chamber, said filter coils having apertured tubes arranged therein, said apertured discharge tubes communicating with the header apertures in each unit, the liquid from said tubes being directed to said outlet member from the apertures of said header and distributor chamber of the adjacent housing, said housings dividing the interior of the casing into distributor chambers and a filtering space, means on the lower cover for draining said filtering space, and means for draining the distributor chamber in the inlet housing.

References Cited in the file of this patent

UNITED STATES PATENTS

| 1,866,970 | Garland | July 12, 1932 |
| 2,038,355 | Liddel et al. | Apr. 21, 1936 |
| 2,383,672 | Neisingh | Aug. 28, 1945 |
| 2,399,887 | Olson | May 7, 1946 |
| 2,487,769 | Ebert et al. | Nov. 8, 1949 |
| 2,609,933 | Ross | Sept. 9, 1952 |

FOREIGN PATENTS

| 4,028 | Great Britain | of 1882 |
| 21,681 | Great Britain | of 1884 |
| 636,693 | France | Apr. 14, 1928 |
| 145,995 | Austria | May 25, 1936 |
| 572,996 | Great Britain | Nov. 1, 1945 |